(12) United States Patent
Duvanenko et al.

(10) Patent No.: US 8,294,772 B2
(45) Date of Patent: Oct. 23, 2012

(54) SYSTEM AND METHOD FOR MONITORING CONNECTIONS WITHIN AN ANALOG VIDEO SYSTEM

(75) Inventors: Victor Joseph Duvanenko, Carmel, IN (US); Jeffrey Lee Standish, Noblesville, IN (US)

(73) Assignee: Pelco, Inc., North Billerica, MA (US)

( * ) Notice: Subject to any disclaimer, the term of this patent is extended or adjusted under 35 U.S.C. 154(b) by 729 days.

(21) Appl. No.: 12/362,039

(22) Filed: Jan. 29, 2009

(65) Prior Publication Data
US 2010/0188513 A1 Jul. 29, 2010

(51) Int. Cl.
*H04N 17/00* (2006.01)
*H04N 5/228* (2006.01)

(52) U.S. Cl. ..................... 348/192; 348/180; 348/222.1

(58) Field of Classification Search .................. 348/143, 348/192
See application file for complete search history.

(56) References Cited

U.S. PATENT DOCUMENTS

| | | | |
|---|---|---|---|
| 5,221,967 A | 6/1993 | Ward et al. | |
| 5,274,446 A * | 12/1993 | Ashida | 348/192 |
| 5,646,675 A * | 7/1997 | Copriviza et al. | 725/22 |
| 5,654,751 A * | 8/1997 | Richard, III | 348/192 |
| 5,808,671 A | 9/1998 | Maycock et al. | |
| 5,854,902 A | 12/1998 | Wilson et al. | |
| 5,874,992 A * | 2/1999 | Caporizzo | 348/192 |
| 6,366,314 B1 | 4/2002 | Goudezeune et al. | |
| 6,369,852 B1 * | 4/2002 | Honda | 348/192 |
| 6,377,299 B1 | 4/2002 | Hamada | |
| 6,493,024 B1 | 12/2002 | Hartley et al. | |
| 6,603,505 B1 | 8/2003 | Kawada et al. | |
| 6,775,547 B2 | 8/2004 | Zimmerman et al. | |
| 6,847,395 B2 | 1/2005 | Thomas et al. | |
| 6,880,115 B2 | 4/2005 | Abraham et al. | |
| 6,943,827 B2 | 9/2005 | Kawada et al. | |
| 7,154,533 B2 | 12/2006 | Sheldon et al. | |
| 7,199,819 B2 | 4/2007 | Sugimoto et al. | |
| 7,233,348 B2 | 6/2007 | Bourret | |
| 2002/0102942 A1 | 8/2002 | Taori et al. | |
| 2002/0105597 A1 * | 8/2002 | Janko et al. | 348/700 |
| 2004/0183947 A1 | 9/2004 | Lee | |
| 2005/0280640 A1 | 12/2005 | Bonorden et al. | |
| 2007/0046821 A1 | 3/2007 | Mead et al. | |
| 2007/0237227 A1 * | 10/2007 | Yang et al. | 375/240.12 |
| 2008/0198234 A1 * | 8/2008 | Nilsson et al. | 348/193 |
| 2010/0111194 A1 * | 5/2010 | Pyo | 375/240.25 |

* cited by examiner

*Primary Examiner* — Ngoc-Yen Vu
(74) *Attorney, Agent, or Firm* — Woodard, Emhardt, Moriarty, McNett & Henry LLP

(57) ABSTRACT

The invention relates to a system and method for monitoring connection performance within a network. In one embodiment, the invention is implemented by analyzing an array of status bits outputted by an analog to digital video decoder. By storing and statistically analyzing an array of status information units, the person monitoring the network can quickly and efficiently be notified of a connection problem, such as a degrading connection resulting in an intermittent signal. In another embodiment, the system and method are implemented by analyzing an array of time stamps outputted when processing frames of video from an analog video camera.

22 Claims, 5 Drawing Sheets

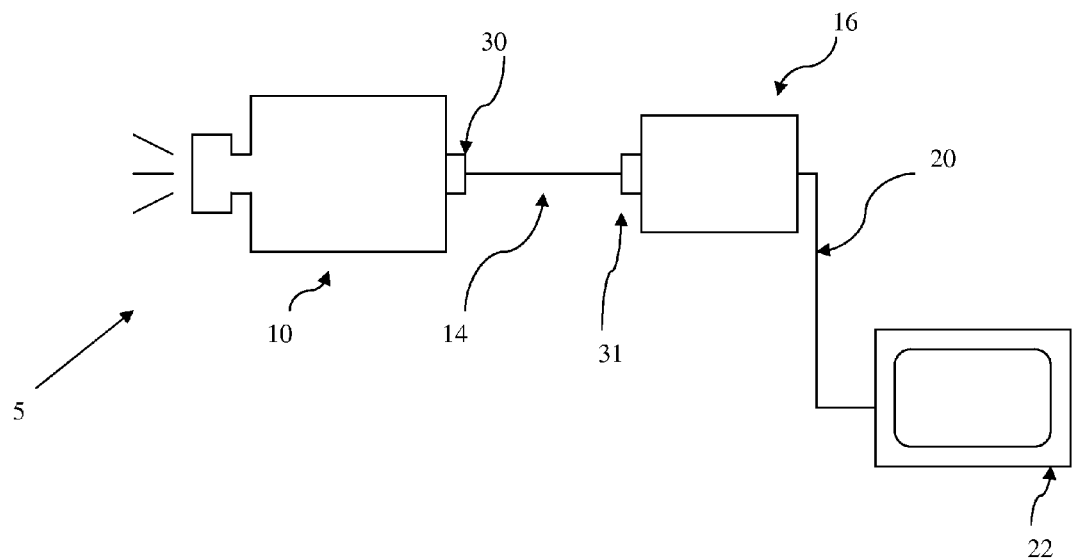
Fig. 1
(Prior Art)
Fig. 3
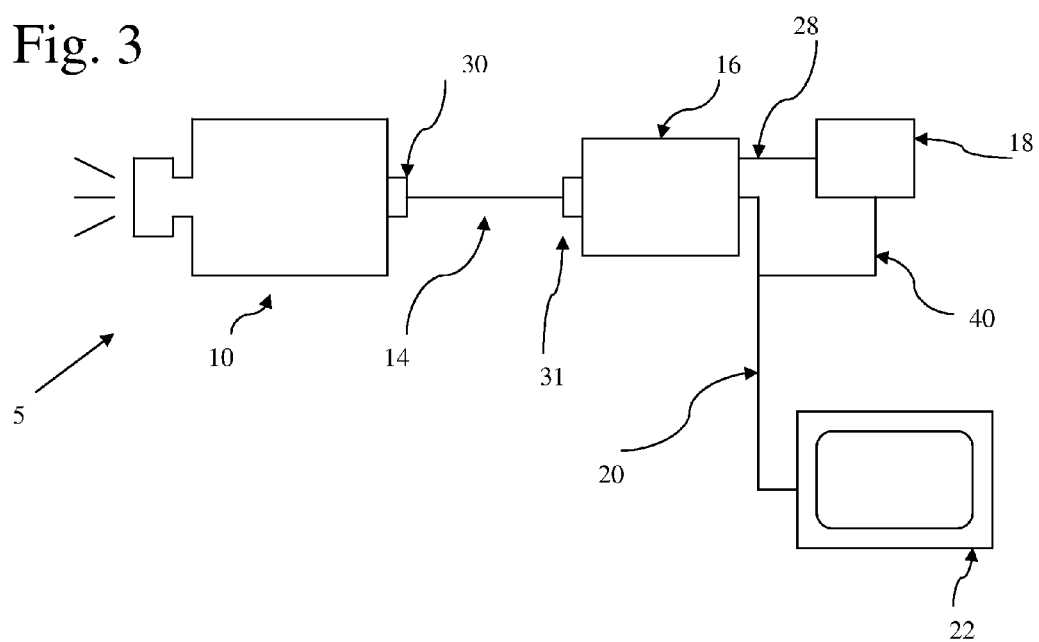

SYSTEM AND METHOD FOR MONITORING CONNECTIONS WITHIN AN ANALOG VIDEO SYSTEM

TECHNICAL FIELD OF THE INVENTION

This invention relates to the monitoring of network performance, and more particularly to a system and method of monitoring connection performance within a security system.

BACKGROUND

Security systems have become an almost necessary expense for most businesses, as well as many homeowners. These systems provide not only peace of mind that the property is being monitored, but the information captured and retained by the systems is often extremely valuable. Current security system technology allows for the monitoring of a location in various ways. Some security systems monitor the activation of security sensors, which could include motion sensors, smoke detectors, window switches, etc. More complex security systems incorporate video cameras that allow the user, or anyone else with access, to visually monitor the location of interest. Because of the expense and purpose of such security systems, the quality of the connections within the system is of the utmost importance.

Most current security systems allow for minimal monitoring of the connections within the security system. Generally, prior systems only provide an indication when an input or connection within the system has failed. Under these security systems, users, customers, and/or installers of the system have no way of knowing if the connections within the system are of good quality or are still fully functional.

Especially in the case of an intermittent signal, a user is likely unaware of any problem with the connection. Current systems may provide some indication when there is no signal entering the network. For example, a system may provide a graphic indicating "No Frame" or "No Video" for every frame lacking a video input. These systems will then remove the indication once the connection or video feed is regained.

Though a few video frames here and there may indicate no signal is being inputted into the system, these small interruptions of signal may go unnoticed by a user that has many signals to monitor simultaneously. It is important, though, for the user, customer, and/or installer to be aware of such intermittence because it may indicate a poor or degrading connection. In which case, it is beneficial to remedy the problem before the signal is completely lost and valuable information is no longer received.

Other connection monitoring devices or systems require an interruption in communication while diagnosing the system. For obvious reasons, such an interruption is undesirable.

Accordingly, there exists a need for a system and method which provides for the accurate monitoring of connection quality within a security network.

SUMMARY

In accordance with the present disclosure, a system and method are provided which inform the user or monitor of a system with information pertaining to connection quality. By analyzing data already available within most systems, the need for a connection quality monitoring system is eliminated. In one form, the status bit of an analog to digital video decoder can be analyzed. By running a statistical analysis on an array of status bits, connection performance data can be calculated over a specified period of time. The connection performance data can then reported to the user, who is then able to evaluate whether the connections within the system are meeting the user's expectations.

In another embodiment, the frame-rate from a network camera can be analyzed. A system requests a particular frame-rate from a camera, which can be verified during installation. During the lifetime of the system, however, the camera's requested frame-rate may begin to not be met due to a variety of problems with camera connections. By analyzing the frame-rate received and comparing it to the frame-rate requested, the system user can be quickly alerted of any potential connection problems.

The disclosed invention provides a number of advantages. One advantage is that the user or network monitor can be quickly informed of any connection problems within the network without interrupting the connection. Because connection problem information is likely given before the connection is severed and detected during normal operation, the user or owner is then able decide how to remedy the problem before the system completely fails.

Another advantage is that the system and method analyzes data already available within most networks. Therefore, no modifications need to be made to the pre-existing cameras, sensors, wires, connectors or video decoders. The disclosed system provides a cost-effective means to monitor connection quality in a novel way. Additionally, the disclosed system presents information previously unavailable to a user before. The connection quality information can be used to determine an overall system health score, as well as be reported as a component of the SNMP heath monitoring of the security system.

This summary is provided to introduce a selection of concepts in a simplified form that are described in further detail below. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings containing herein.

BRIEF DESCRIPTION OF THE DRAWINGS

FIG. 1 depicts a block diagram of a surveillance system network typical of the prior art.

FIG. 3 is a block diagram depicting a surveillance system network according to an embodiment of the present invention.

DETAILED DESCRIPTION

For the purposes of promoting an understanding of the principles of the invention, reference will now be made to certain embodiments thereof and specific language will be used to describe the same. It should nevertheless be understood that no limitation of the scope of the invention is intended. Any alterations, modifications and further applications of the principles of the invention as described herein are contemplated as would normally occur to one of ordinary skill in the art to which the invention relates.

Referring to FIG. 1, there is disclosed a surveillance system typical of the prior art. A typical system of the prior art includes an analog video camera 10, analog to digital video decoder 16, and a monitor unit 22. The analog video camera 10 is connected to video decoder 16 through video line 14. Video line 14 is connected to camera 10 and video decoder 16 at connections 30, 31. Video decoder 16 is connected to monitor unit 22 by digital video line 20.

Figure 2:
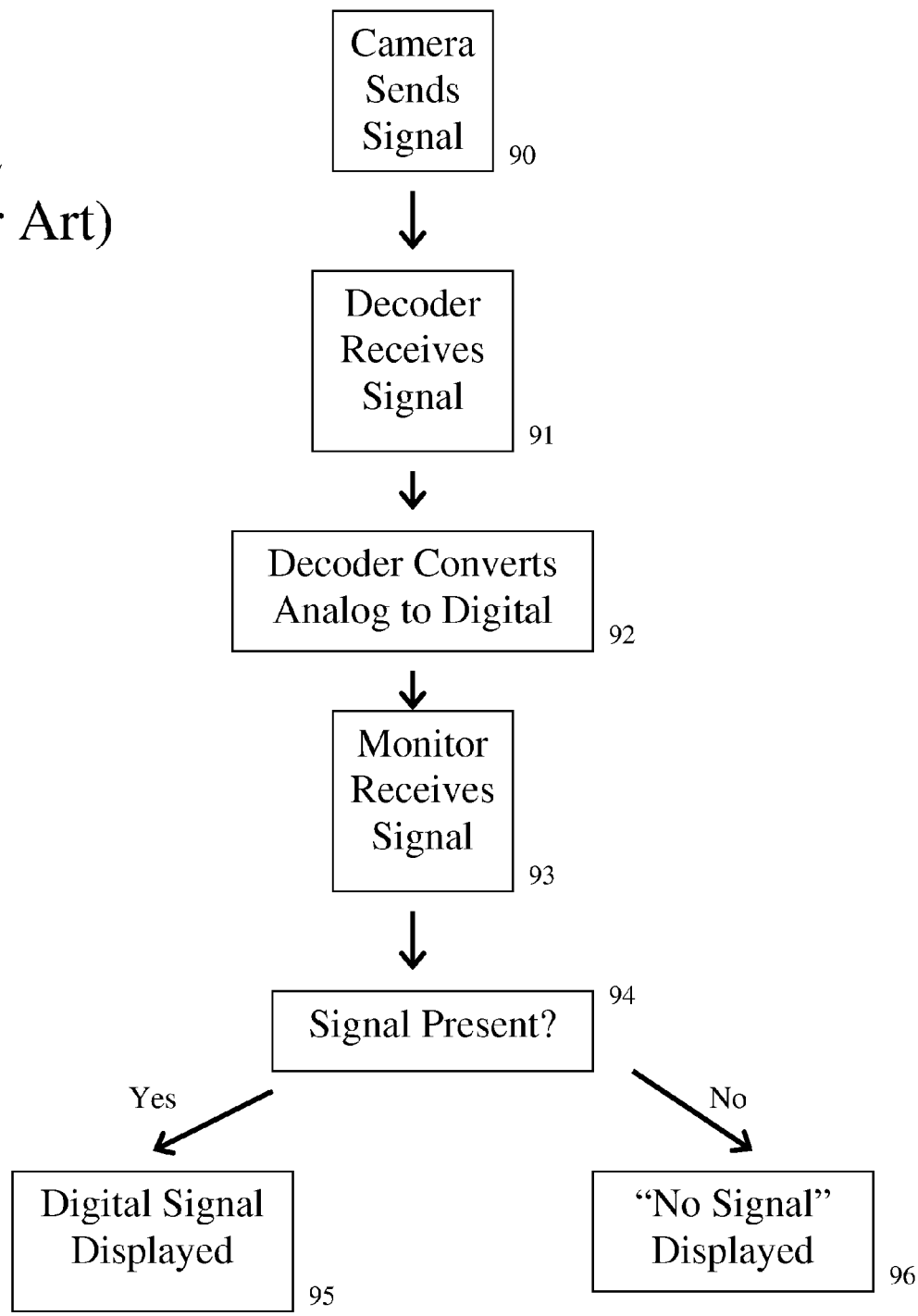
FIG. 2 is a flow chart illustrating the surveillance system methodology typical of the prior art.

Referring now to FIG. 2, while maintaining reference to numerals depicted in FIG. 1, there is disclosed the methodology of one embodiment of a typical prior art surveillance system. In accordance with the typical prior art, analog video camera 10 transmits a video signal (step 90) through connection 30, video line 14 and connection 31 to be received by the video decoder 16 (step 91). The video decoder 16 converts the analog video signal into digital format (step 92). The video decoder 16 then transmits the digital video signal, which is received by the monitor unit 22 (step 93). When the monitoring unit 22 expects to receive the digital video signal, the monitor unit 22 determines whether or not a signal is present (step 94). If a digital signal is present, then the monitor unit 22 will display the video image to the user (step 95). However, if no signal is received, the monitor unit 22 will display a message to the user, such as "No Signal" or "No Video," (step 96) thereby informing the user of a possible camera or connection problem.

As appreciated by those of ordinary skill in the art, the video camera 10 is streaming the video signal at a rapid rate (step 90). Therefore, the entire process is recurring as fast as the camera is sending frames to the video decoder. While monitor unit 22 may display "No Signal" or "No Video," if the video camera 10 is sending multiple frames of video data per second, it is likely that a few infrequent frames of "No Signal" or "No Video" will go unnoticed. Thus, if connections 30, 31 are poor or degrading, the resulting intermittent signal may not be detected by the user of the system.

Referring now to FIG. 3, a block diagram depicts a system for determining connection performance within the system according to an embodiment of the present invention. System 5 includes an analog video camera 10, analog-to-digital video decoder 16, and monitor unit 22. Camera 10 is interfaced to video decoder 16 through video line 14. Video line 14 provides a line of communication between camera 10 and video decoder 16 and is connected to video camera 10 and video decoder 16 at connections 30, 31. As such, video line 14 can be a coaxial cable or twisted pair cable. In another embodiment, video camera 10 and video decoder 16 communicate wirelessly.

Video decoder 16 is also connected to monitor unit 22 through digital video line 20. Additionally, video decoder 16 is connected to processing unit 18 through status information line 28. Processing unit 18 comprises any device having a processor, such as an electronic microprocessor, capable of numerically analyzing data input to processing unit 18. Processing unit 18 may additionally include data storage means, such as an electronic memory device, for storing data input to the processing unit 18. Processing unit 18 is then connected to monitor unit 22 and digital video line 20 through performance data line 40.

Figure 4:
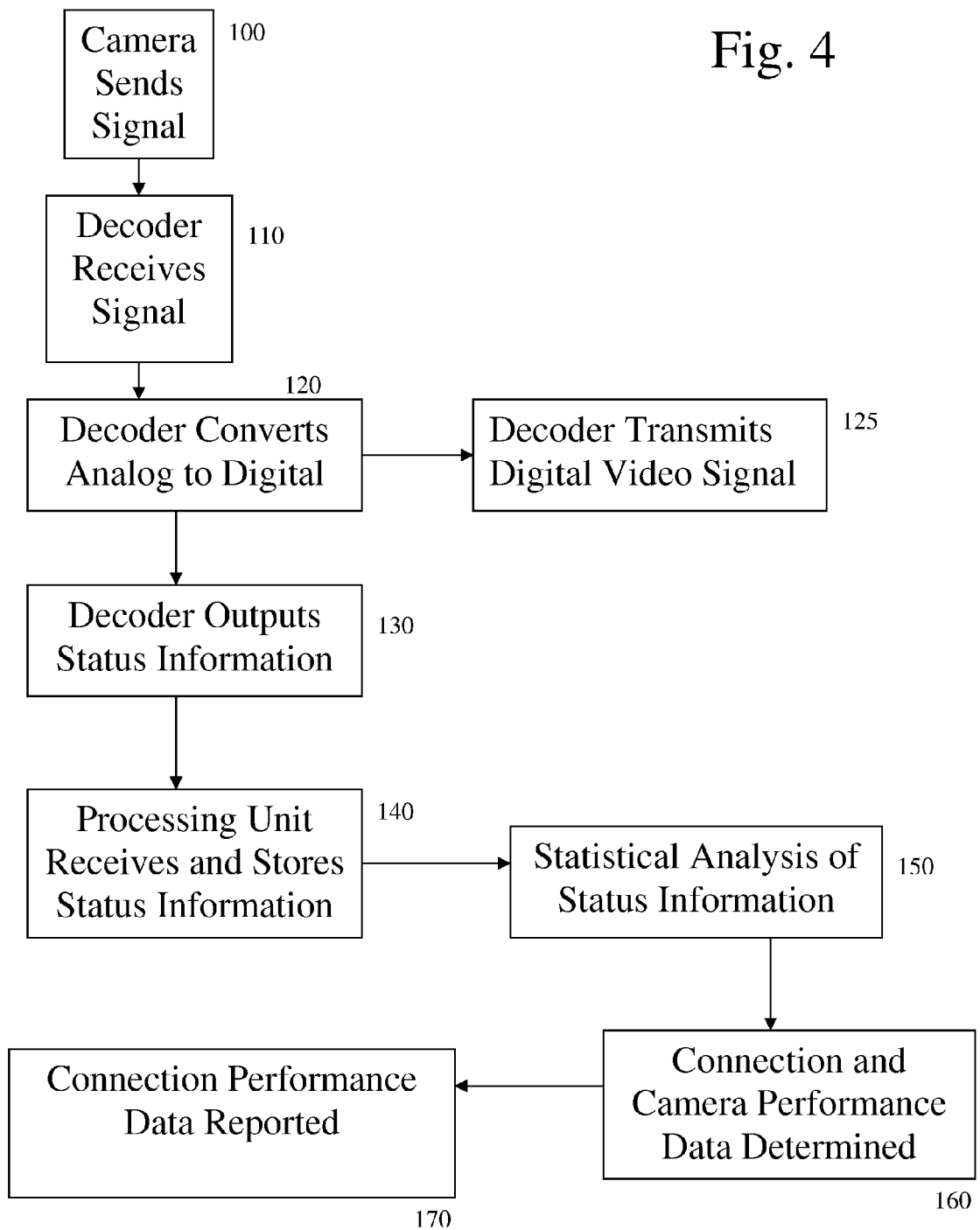
FIG. 4 is flow chart depicting the determination of connection performance based on status information outputs.

Referring now to FIG. 4, while maintaining reference to the numerals of FIG. 3, there is disclosed the methodology of a surveillance system according to the preferred embodiment of the present invention. A video camera 10 transmits an analog video signal (step 100) through video line 14. The analog video signal must pass connections 30, 31 before reaching video decoder 16. The transmitted analog video signal is then received by video decoder 16 (step 110). The video decoder 16 converts the analog signal to digital format (step 120) and then transmits the digital video to the monitor unit 22 (step 125).

It will be appreciated by those skilled in the art that for every frame video camera 10 transmits to video decoder 16, video decoder 16 outputs various types of information. The disclosed system analyzes certain types of information to determine the connection performance status. One type of status information is a status bit which outputted by most commercial video decoders, such as Analog Devices Model No. ADV7180, Techwell Model No. TW9910, and Texas Instruments Model No. TVP5146. The state of the status bit depends on whether the decoder received a valid signal. Generally, the status bit is intended for use in debugging during engineering of the video circuit and is used in very limited ways in final system designs. The disclosed system is capable of utilizing the already present status bit to determine connection performance.

It will also be appreciated that camera 10 and video decoder 16 can be viewed as comprising a data unit capable of receiving an input signal and transmitting output data. In this context, the input signal is the visual information received by camera 10 and the output data is the status information. As will be discussed in more detail below, it is also contemplated that camera time information could also comprise a data unit.

As noted above, upon converting the analog video signal to digital format (step 120), the video decoder outputs status information (step 130). Status information line 28 relays the status information from the video decoder 16 to the processing unit 18 (step 130). Upon receipt, the status information is stored by the processing unit 18 (step 140). It has been contemplated and within the scope of the present invention to store the status information permanently, semi-permanently, or temporarily. When a sufficient amount of status information has been received and stored, the processing unit performs a statistical analysis on a plurality of status information units (step 150) to determine the connection performance over a predetermined time period. It is contemplated that after the statistical analysis has been performed, the stored status information can continue to be stored or the status information can removed from memory. The statistical analysis performed allows for the connection performance data to be determined (step 160). With this data available, the connection performance data is then reported to the user (step 170) who can be informed of connection or camera problems via visual, audible, and/or other notification methods.

As will be appreciated by those skilled in the art, various types of statistical analyses can be performed on the plurality of status information. By way of example, a running average analysis can be implemented. Further assume that 10 status information units are outputted by the video decoder 16 each second and that the user requests connection performance data corresponding to the previous 30 seconds to be displayed. Processing unit 18 will then calculate the running average of the 300 most recent status information units. If the data contained 150 "good" status information units and 150 "bad" status information units, the connection performance value would be 50%. Regardless of whether this value is displayed numerically or by way of a visual graphic, the user would be informed that the system is only receiving a signal from camera 10 half of the time. The user would then be on notice of a potential intermittent problem with network connections 30, 31.

The status information may also be analyzed forensically. The stored data may be analyzed over long period of time (e.g., days, months, years) where trends can be detected and reported. These trends may indicate whether connections to the video camera are becoming better or worse and how quickly. Similarly, patterns within the failure, or "bad," status information units may be analyzed, in which certain types of failures may be deduced from these patterns. Through forensic analysis, other patterns may be determined that may not have been discovered during real-time analysis. Additionally, commonalities of problems between several cameras may indicate problems with the distribution amplifiers. The connection quality information may also be used to determine an overall system health score, as well as be reported as a component of the SNMP heath monitoring of the security system.

Figure 5:
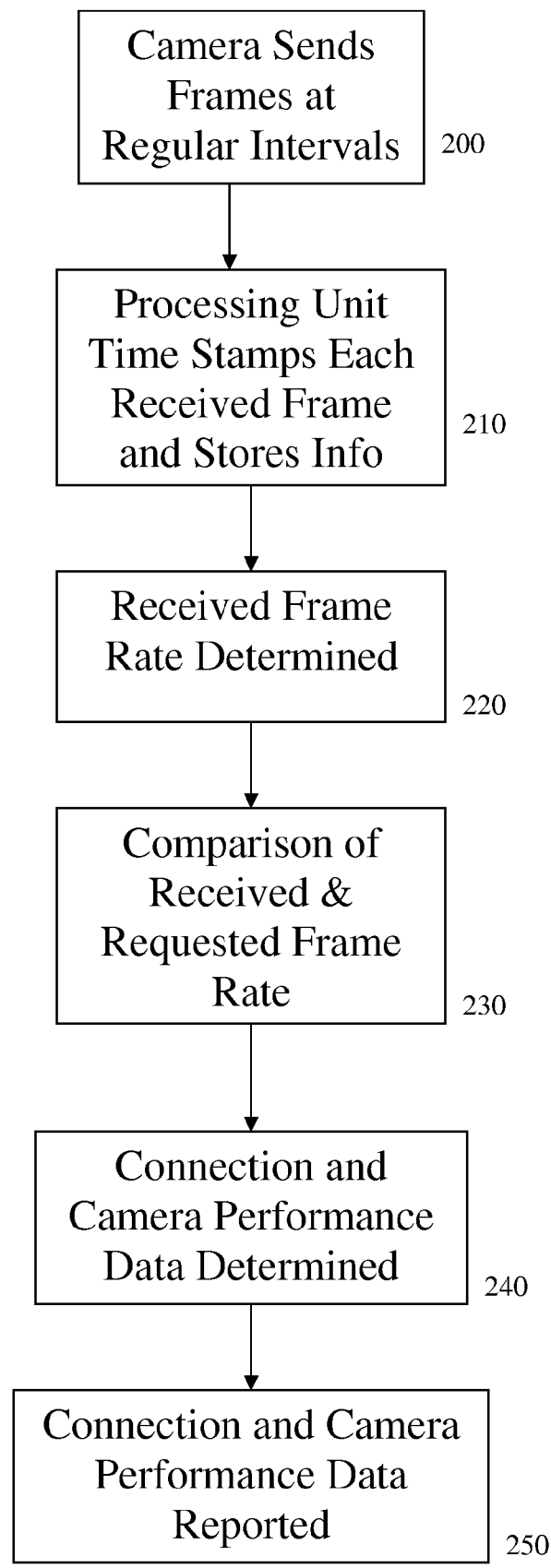
FIG. 5 flow chart depicting the determination of connection performance based on the frame rate of a camera.

Referring now to FIG. 5, while maintaining reference to numerals depicted in FIG. 3, there is disclosed a flow diagram illustrating the methodology of a further embodiment. The process starts when a camera 10 provides frames of video through video line 14 (step 200). A processing unit 18 then receives the video, time stamps each frame, and stores the time stamp information (steps 210). Upon storage of a sufficient amount of time stamp information, the processing unit 18 determines the received frame rate (step 220) by calculating the intervals between successive time stamps. Processing unit 18 then compares the received frame rate to the frame rate originally requested by the user (step 230). This comparison allows for the connection and camera performance data to be determined (step 240). The connection performance data is then transmitted via connection and camera performance line 40 and reported to the user via monitor unit 22 (step 250).

Figure 6:
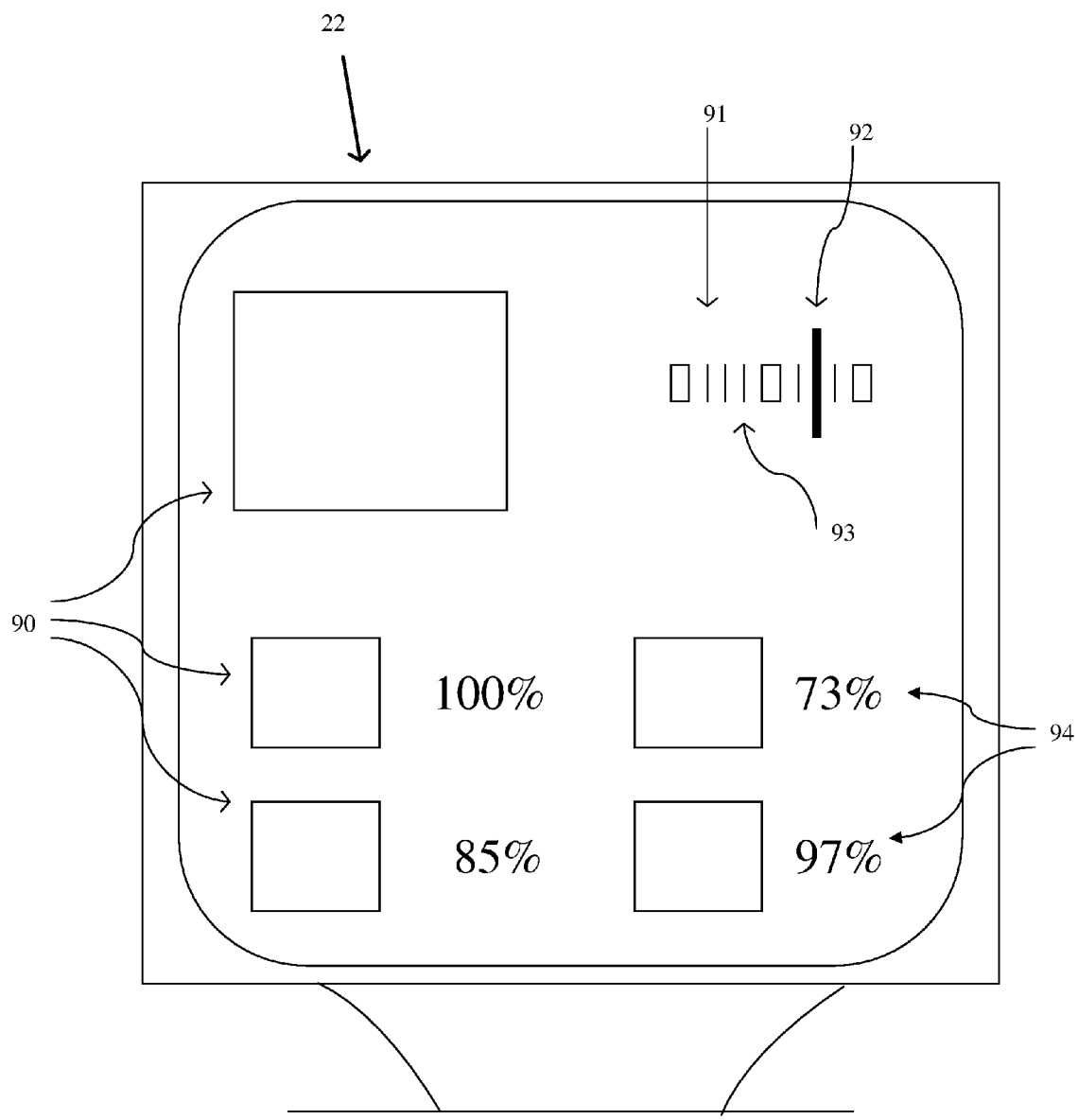
FIG. 6 depicts a screen shot of a monitor reporting the connection performance of the system according to an embodiment of the present invention.

FIG. 6 illustrates a screen shot depicting one embodiment of the display of monitor unit 22. As shown, monitor unit 22 displays the video images 90 of various cameras. Graphical display 91 reports the connection performance value in a graphical way. The position of indicator 92 relative to scale 93 allows a user to quickly ascertain the connection performance value. Numerical displays 94 similarly report the connection performance data in a numerical fashion. As shown, the value shown indicates the percentage of time a valid signal is received. In one form, the disclosed display is multi-resolutional to show not only the connection performance data corresponding to the recent history, but also the connection performance data over an extended period of time.

As will be appreciated by those skilled in the art, there are various ways to report the connection performance data and/or connection problems while still being within the scope of the present invention. For example, monitor unit 22 could include an audible and/or visual alarm which would sound when the connection performance value falls below a predetermined threshold. In other embodiments, a remote user is notified via e-mail message, pager or cellular telephone call or text message.

As will be appreciated by those of ordinary skill in the art, various types of information may comprise the status information. For example, the processing unit may receive and store information to the AGC gain level. By analyzing changes in the AGC gain level, it may be determined that the signal has become weaker over time, thereby indicating potential connection degradation. Analysis of the AGC gain level may also indicate that the camera has lost color lock.

While the invention has been illustrated and described in detail in the drawings and foregoing description, the same is to be considered as illustrative and not restrictive in character. It should be understood that only certain embodiments have been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications, as well as all relationships equivalent to those illustrated in the drawings and described in the specification.

What is claimed is:

1. A system for monitoring the connections within a video network, the system comprising:
    a video camera operable to transmit an analog video signal;
    a video decoder operably connected to said video camera by at least one connection, said video decoder receiving said analog video signal over said connection, said video decoder operable to output a plurality of status information units for a plurality of corresponding frames of video received by said analog video signal; and
    a processing unit operably coupled to said video decoder for receipt of said plurality of status information units, said processing unit operable to store said plurality of status information units;
    wherein said plurality of status information units indicates whether said video signal is valid;
    wherein said processing unit is operable to perform a statistical analysis on said plurality of information units stored by said processor, said plurality of information units corresponding to a particular time span, said statistical analysis determining connection performance data of said at least one connection during said time span.

2. The system of claim 1, further comprising:
    a digital video output line coupled to said video decoder, wherein said video decoder transmits a digital video signal through said digital video line;
    a connection performance line coupled to said processing unit, wherein said processing unit transmits said connection performance data through said connection performance line; and
    a display for displaying information;
    wherein said connection performance line and said digital video output line are coupled to said display.

3. The system of claim 2, wherein said display comprises a video monitor unit.

4. The system of claim 3, wherein said monitor unit is operable to visually display said connection performance data.

5. The system of claim 3, wherein said monitor unit is operable to visually display said digital video signal.

6. The system of claim 1, further including a monitor unit connected to said processing unit.

7. The system of claim 6, wherein said monitor unit is operable to visually display said connection performance data.

8. A method for evaluating the performance of one or more connections within a network, the method comprising:
    transmitting an analog video signal;
    receiving said analog video signal at a video decoder;
    decoding said analog video signal into a digital video signal;
    outputting a plurality of status information units indicating whether said video signal is valid for a plurality of corresponding frames of video received by said video decoder;
    receiving and storing said plurality of status information units; and
    analyzing said plurality of status information units to determine connection performance data of said connections.

9. The method of claim 8, wherein said status information unit comprises a status bit outputted by said video decoder.

10. The method of claim 8, further comprising the steps of:
   determining time stamps for a plurality of said frames of video;
   determining a received frame rate from said time stamps; and
   determining the performance of said connections by calculating changes in said received frame rate.

11. The method of claim 10, further comprising the step of transmitting said connection performance data to a monitor unit over said network.

12. The method of claim 11, further comprising the step of visually displaying connection performance data using said monitor unit.

13. The method of claim 8, further comprising the step of audibly reporting said connection performance data.

14. A video network connection monitoring system comprising:
   a video camera operable to transmit an analog video signal;
   a video decoder operable to receive said analog video signal;
   at least one connection coupling said analog video signal from said video camera to said video decoder; and
   a processing unit operably coupled to said video decoder;
   wherein said video decoder is operable to transmit output data indicating a current connection performance of said at least one connection;
   wherein said processing unit receives said output data from said video decoder and said processing unit is operable to store said output data;
   wherein said processing unit is operable to perform a statistical analysis on a portion of said output data stored by said processor corresponding to a particular time period, said statistical analysis determining connection performance data of said at least one connection.

15. The system of claim 14 wherein said processing unit determines said connection performance by analyzing changes in the AGC gain level of said decoder.

16. The system of claim 14 wherein said processing unit further determines loss of color lock in said camera by analyzing changes in the AGC gain level of said video decoder.

17. The system of claim 14 wherein said processing unit determines said connection performance by calculating changes in the received frame rate.

18. The system of claim 14 wherein said output data is a status bit associated with each individual frame.

19. The system of claim 14 wherein said particular time period is less than about 1 hour.

20. The system of claim 14 wherein said particular time period is greater than about 1 hour.

21. The system of claim 14 further comprising a monitor unit interfaced with said processing unit, wherein said processing unit transmits said connection performance data for display on said monitor unit.

22. The system of claim 14 further comprising a monitor unit interfaced with said processing unit, wherein said processing unit determines and transmits an overall system health score to said monitor unit.

* * * * *